United States Patent
Elquest (10) Patent No.: US 9,227,675 B1
(45) Date of Patent: Jan. 5, 2016

(54) CONVERTIBLE PICKUP TRUCK CARGO BOX SYSTEM

(71) Applicant: Jason Elquest, Litchfield Park, AZ (US)

(72) Inventor: Jason Elquest, Litchfield Park, AZ (US)

( * ) Notice: Subject to any disclaimer, the term of this patent is extended or adjusted under 35 U.S.C. 154(b) by 0 days.

(21) Appl. No.: 14/222,322

(22) Filed: Mar. 21, 2014

(51) Int. Cl.
| | |
|---|---|
| *B62D 33/033* | (2006.01) |
| *B60R 13/04* | (2006.01) |
| *B60P 1/64* | (2006.01) |
| *B62D 33/02* | (2006.01) |

(52) U.S. Cl.
CPC .............. *B62D 33/033* (2013.01); *B60P 1/64* (2013.01); *B60R 13/04* (2013.01); *B62D 33/02* (2013.01)

(58) Field of Classification Search
CPC ......... B60P 1/64; B60P 1/6418; B60R 13/04; B62D 33/02; B62D 33/0207; B62D 33/023; B62D 33/027; B62D 33/0276; B62D 33/033
USPC .......... 296/3, 10, 26.01, 26.04, 26.12, 32, 36, 296/181.3, 181.7, 183.1; 224/42.32, 42.33, 224/402, 403
See application file for complete search history.

(56) References Cited

U.S. PATENT DOCUMENTS

| | | | |
|---|---|---|---|
| 777,020 | A | 12/1904 | Hampton |
| 1,425,596 | A | 8/1922 | Kramer |
| 1,817,157 | A | 8/1931 | Luckow |
| 2,537,711 | A | 1/1951 | Seckel |
| 2,821,431 | A | 1/1958 | Crompton |
| 3,097,880 | A | 7/1963 | Reader |
| 3,126,224 | A | 3/1964 | Carter, Jr. et al. |
| 3,692,354 | A | 9/1972 | Tuerk |
| 3,741,605 | A * | 6/1973 | Lee .................................. 296/10 |
| 4,328,988 | A | 5/1982 | Patterson et al. |
| 4,489,977 | A * | 12/1984 | Earing, Jr. ..................... 296/35.3 |
| 4,569,554 | A * | 2/1986 | Dodgen ......................... 296/156 |
| 4,867,497 | A * | 9/1989 | Jayne ................................ 296/3 |
| 5,628,540 | A * | 5/1997 | James .............................. 296/3 |
| 5,882,058 | A | 3/1999 | Karrer |
| 6,196,603 | B1 | 3/2001 | Schambre et al. |
| 6,758,514 | B1 | 7/2004 | Walkden |
| 7,322,627 | B1 * | 1/2008 | Nicholson ....................... 296/25 |
| 2005/0057073 | A1 * | 3/2005 | Hunt .......................... 296/183.1 |
| 2005/0067849 | A1 | 3/2005 | Walkden |
| 2007/0222247 | A1 * | 9/2007 | Jaeck .......................... 296/26.02 |
| 2009/0072564 | A1 * | 3/2009 | Teeple ............................ 296/10 |

(Continued)

OTHER PUBLICATIONS http://www.truckcraft.com/imageDetail.asp?id=202.

(Continued)

*Primary Examiner* — Jason S Daniels
(74) *Attorney, Agent, or Firm* — Booth Udall Fuller, PLC (57) ABSTRACT

A convertible pickup truck cargo box system is disclosed that allows a pickup truck to easily transform into a flat bed truck, giving a greater range of utility, versatility, options, and cosmetic appearance for both commercial/work applications and recreational/personal applications in just one vehicle. The convertible pickup truck cargo box system may include a convertible cargo box that has a flat bed, a fold up headache rack, removable side panels, and a removable tailgate assembly. The seam between the side panels and the flat bed may be concealed by side trim molding so that their interface is not seen, giving the normal cosmetic appearance of a standard pickup truck. Thus, the pickup truck can be converted easily from a normal looking pickup truck for recreational and personal applications into a flat bed truck for commercial and work applications by removing and storing the side panels and the tailgate assembly.

19 Claims, 7 Drawing Sheets

(56) References Cited

U.S. PATENT DOCUMENTS

2009/0115222 A1* 5/2009 Hohnl et al. .............. 296/183.1
2009/0214325 A1* 8/2009 White ........................ 414/537

OTHER PUBLICATIONS http://www.truckcraft.com/imageDetail.asp?id=203.

* cited by examiner

CONVERTIBLE PICKUP TRUCK CARGO BOX SYSTEM

BACKGROUND

1. Technical Field

This document relates to modifications for pickup trucks, and more specifically to a convertible pickup truck cargo box system.

2. Background

There has always been an interest in light trucks of all kinds, especially pickup trucks. Typically, vehicles of this type include a generally rectangular cargo box located on a rearward portion of the vehicle frame. Pickup trucks are used in a wide variety of commercial, as well as recreational endeavors. Some pickup truck modifications exist for these purposes. But too often these conventional modifications do not provide the full utility, versatility, and cosmetic appearance that is needed in both commercial/work and recreational/personal applications. That is, a consumer is relegated to choosing between a pickup truck that is primarily to be used for a recreational/personal purpose (at the expense of not being able to have the full versatility of function that commercial/work applications would require), or a truck that is primarily to be used for a commercial/work purpose (at the expense of not being able to have the full versatility of function and the cosmetic appearance that recreational/personal applications would require). Often this choice comes down to choosing between a normal looking pickup truck and a flat bed work truck.

SUMMARY

Aspects of this document relate to a convertible pickup truck cargo box system. These aspects may comprise, and implementations may include, one or more or all of the components and steps set forth in the appended CLAIMS.

In one aspect, a convertible pickup truck cargo box system is disclosed that allows a pickup truck to easily transform into a flat bed truck, giving a greater range of utility, versatility, options, and cosmetic appearance for both commercial/work applications and recreational/personal applications in just one vehicle. The convertible cargo box system for a pickup truck may include a flat bed. Opposing side panels may be removably coupled atop the flat bed, each side panel comprising a tail/brake/turn signal light assembly. Side trim molding may conceal a seam interface between the side panels and the flat bed, thereby providing an appearance of a standard pickup truck cargo box.

Thus, the pickup truck can be converted easily from a normal looking pickup truck for recreational and personal applications into a flat bed truck for commercial and work applications by removing and storing the side panels and the tailgate assembly.

Implementations may include one or more or all of the following.

The side trim molding may be: coupled to the side panels; coupled to the flat bed; or coupled to both the side panels and the flat bed. The side trim molding that is coupled to both the side panels and to the flat bed may include separate upper molding portions coupled to the side panels and separate lower molding portions coupled to the flat bed. The separate upper molding portions may interface with the separate lower molding portions in: a tongue and groove arrangement; a butt joint arrangement; a rabbet joint arrangement; a half lap joint arrangement; a drop leaf joint arrangement; a snap fit arrangement; or an interlocking channel arrangement.

The removable side panels may be removably coupled atop the flat bed in a post and pocket arrangement. The flat bed may include at least two opposing pairs of spaced apart pockets, each pair of pockets defined along an opposing side peripheral edge of the flat bed. Each side panel may include at least one pair of spaced apart posts located along its bottom, each pair of posts corresponding to and removably coupled with one of the opposing pairs of spaced apart pockets. Locking pins may removably engage the posts once they are installed in the pockets to hold the side panels in place. The locking pins may be electronic locking pins that are electrically coupled to an electronic switch in a cab of the pickup truck.

A fold up headache rack may be included and located between the side panels at a forward most transverse wall portion of the cargo box. The headache rack may be foldable in half horizontally and may include an upper portion with a frame in a general shape of a cab of a pickup truck and a lower portion with opposing braces coupled to the flat bed at lower ends and upper ends that are pivotally coupled to either side of the frame of the upper portion.

The flat bed may include secondary flat bed tail/brake/turn signal light assemblies, and further include a rear cover that is removably coupled to a rear of the flat bed above a bumper and below a tailgate assembly so as to conceal the secondary flat bed tail/brake/turn signal light assemblies when not in use. The cover may removably slide into opposing slots formed on or coupled to the flat bed.

In another aspect, the convertible pickup truck cargo box system is disclosed that allows a pickup truck to easily transform into a flat bed truck, giving a greater range of utility, versatility, options, and cosmetic appearance for both commercial/work applications and recreational/personal applications in just one vehicle. The convertible cargo box system for a pickup truck may include a flat bed. Opposing side panels may be removably coupled atop the flat bed, each side panel comprising a tail/brake/turn signal light assembly. Side trim molding may conceal a seam interface between the side panels and the flat bed, thereby providing an appearance of a standard pickup truck cargo box. A fold up headache rack may also be located between the side panels at a forward most transverse wall portion of the cargo box.

Thus, the pickup truck can be converted easily from a normal looking pickup truck for recreational and personal applications into a flat bed truck for commercial and work applications by removing and storing the side panels and the tailgate assembly.

Implementations may include one or more or all of the following.

The side trim molding may be: coupled to the side panels; coupled to the flat bed; or coupled to both the side panels and the flat bed. The side trim molding that is coupled to both the side panels and to the flat bed may include separate upper molding portions coupled to the side panels and separate lower molding portions coupled to the flat bed. The separate upper molding portions may interface with the separate lower molding portions in: a tongue and groove arrangement; a butt joint arrangement; a rabbet joint arrangement; a half lap joint arrangement; a drop leaf joint arrangement; a snap fit arrangement; or an interlocking channel arrangement.

The removable side panels may be removably coupled atop the flat bed in a post and pocket arrangement. The flat bed may include at least two opposing pairs of spaced apart pockets, each pair of pockets defined along an opposing side peripheral edge of the flat bed. Each side panel may include at least one pair of spaced apart posts located along its bottom, each pair of posts corresponding to and removably coupled with one of the opposing pairs of spaced apart pockets. Locking pins may removably engage the posts once they are installed in the pockets to hold the side panels in place. The locking pins may be electronic locking pins that are electrically coupled to an electronic switch in a cab of the pickup truck.

A fold up headache rack may be included and located between the side panels at a forward most transverse wall portion of the cargo box. The headache rack may be foldable in half horizontally and may include an upper portion with a frame in a general shape of a cab of a pickup truck and a lower portion with opposing braces coupled to the flat bed at lower ends and upper ends that are pivotally coupled to either side of the frame of the upper portion.

The flat bed may include secondary flat bed tail/brake/turn signal light assemblies, and further include a rear cover that is removably coupled to a rear of the flat bed above a bumper and below a tailgate assembly so as to conceal the secondary flat bed tail/brake/turn signal light assemblies when not in use. The cover may removably slide into opposing slots formed on or coupled to the flat bed.

The foregoing and other aspects and implementations of a convertible pickup truck cargo box system may have one or more or all of the advantages, as well as the benefits, discussed in this document. Additionally, the foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

This document features a convertible pickup truck cargo box system that allows a pickup truck to easily convert/transform to a flat bed truck and back again, giving a greater range of utility, versatility, options, and cosmetic appearance for both commercial/work applications and recreational/personal applications in just one vehicle. In essence, to transform a personal pickup truck into a work vehicle and then back again.

Generally, a convertible pickup truck cargo box system may include removable side panels and a removable tailgate assembly. In some implementations, the side panels may be attached in a post and pocket arrangement or any other similar arrangement. There may be electronic, hydraulic, or manual locking pins that engage the posts once they are installed in the pockets to hold the side panels in place safely and securely when installed. The seam between the side panels and the flat bed is concealed by side trim molding so that their interface is not seen, giving the normal cosmetic appearance of a standard pickup truck. Thus, the pickup truck can be converted easily into a flat bed truck for commercial/work applications by removing and storing the side panels and the tailgate assembly, and then be converted back again into a normal looking pickup truck for recreational/personal applications by re-installing the side panels and the tailgate assembly.

A convertible pickup truck cargo box system may also include a fold up headache rack at the front of the bed against the cab. In recreational/personal applications, the headache rack may be in its extended position or folded down depending on the choice of the driver and the appearance he/she wants to portray with the vehicle. For commercial/work applications, the headache rack may be in its extended position to help protect the passengers and to otherwise participate in the particular commercial application.

There are many features of a convertible pickup truck cargo box system disclosed herein, of which one, a plurality, or all features may be used in any particular implementation. Additionally, in the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Structure and System

There are a variety of convertible pickup truck cargo box system implementations. Notwithstanding, turning to FIGS. 1-2A and 3A-4E and for the exemplary purposes of this disclosure, convertible pickup truck cargo box system 1 is shown. Convertible pickup truck cargo box system 1 may be in the form of a four-door pickup truck with any length of bed or cargo box for example, though any form of pickup truck is suitable, such as a two-door model, an extended cab model, and the like of any size.

Convertible pickup truck cargo box system 1 generally includes a pickup truck, flat bed 16, removable side walls 8 and 10, and removable tailgate assembly 50. Together (with a rear wall of the cab or a separate front wall attached to the bed 16), flat bed 16, side walls 8 and 10, and tailgate assembly 50 forms a cargo box of the truck when they are in an installed position.

Flat cargo bed 16 is a load-bearing platform and is situated on the chassis of the pickup truck at an appropriate height so that it can have a flat configuration and not interfere with the wheel wells. Upright pockets 17 are spaced apart and defined along flat bed's 16 side peripheral edges, although they may be formed along and around its entire periphery in some implementations. In this particular embodiment, there are three spaced apart pockets 17 defined on each side peripheral edge of flat bed 16 as shown, though in other implementations there can be more or less pockets 17 as the application might require for example.

Figure 4A:
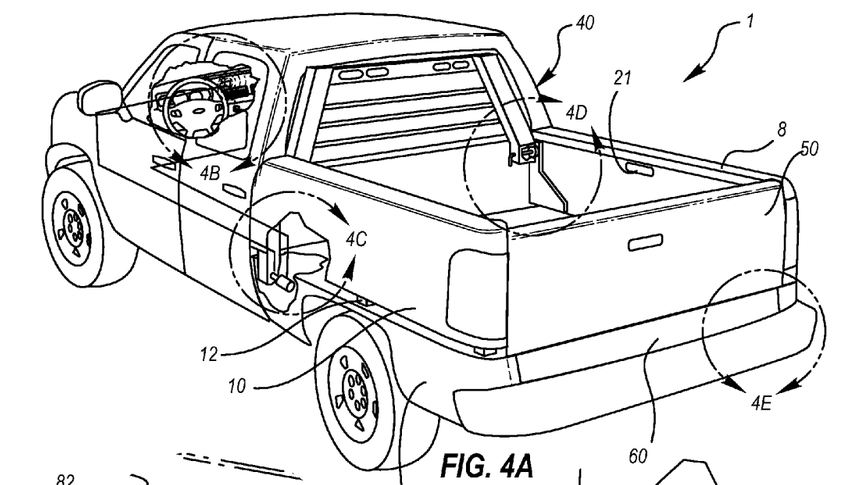
FIG. 4A is a rear exploded perspective view of the convertible pickup truck cargo box system implementation of FIG. 1.
Figure 4B:
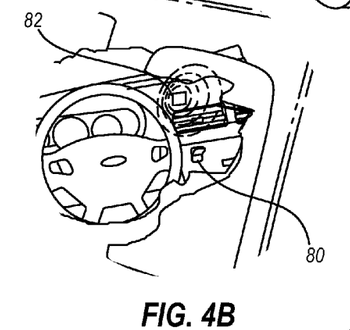
FIG. 4B is a view from FIG. 4A enlarged for magnification purposes.
Figure 4C:
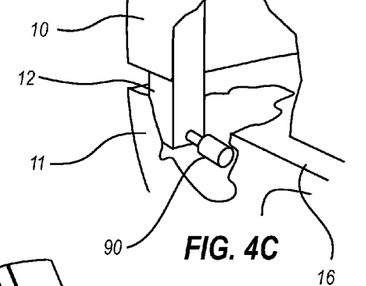
FIG. 4C is a view from FIG. 4A enlarged for magnification purposes.
Figure 4D:
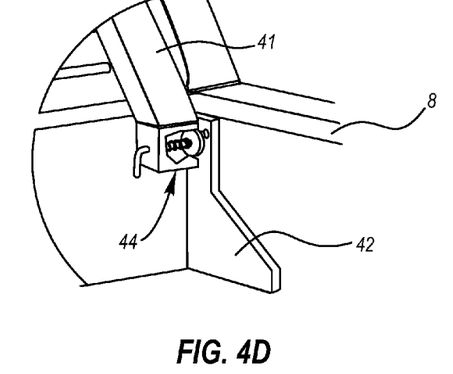
FIG. 4D is a view from FIG. 4A enlarged for magnification purposes.
Figure 4E:
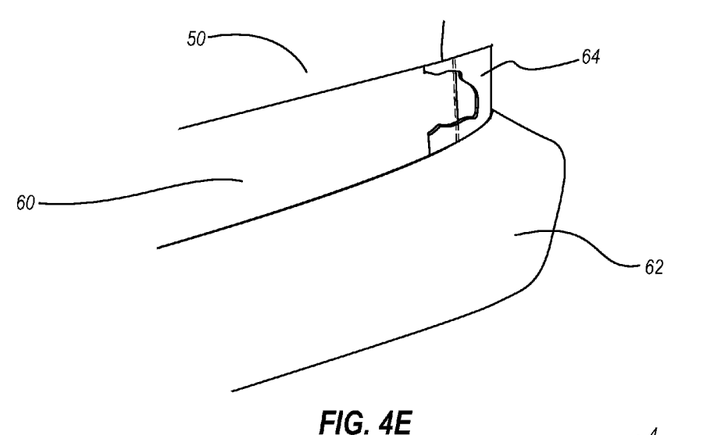
FIG. 4E is a view from FIG. 4A enlarged for magnification purposes.

Caps 19 may be installed into pockets 17 when removable side panels 8 and 10 are removed from bed 16. Caps 17 function to keep dirt, debris, water, etc. out of pockets 17, which could potentially interfere with the mechanical and electrical operation of side panels 8 and 10 and bed 16 and their associated components.

Figure 2A:
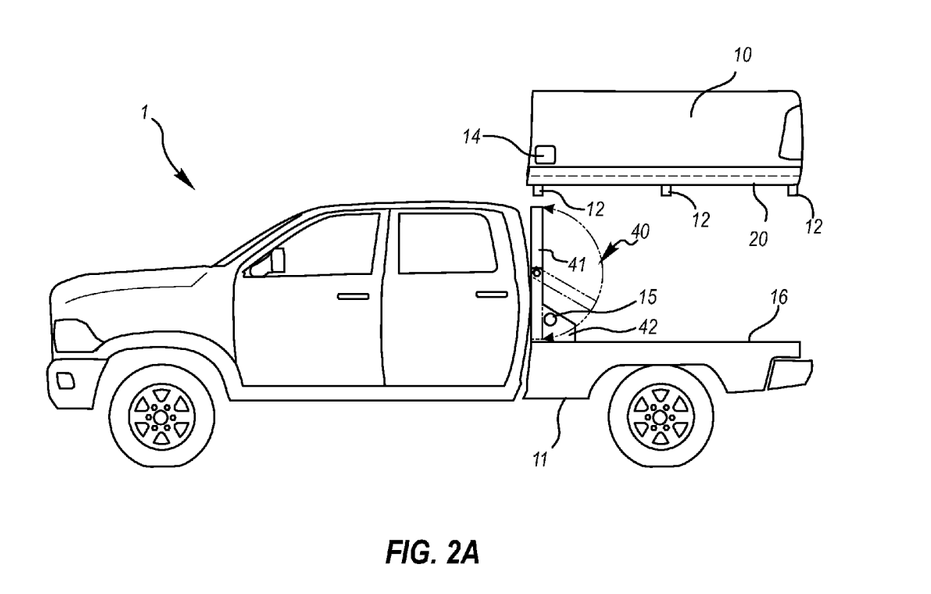
FIG. 2A is a partially exploded side view of the convertible pickup truck cargo box system implementation of FIG. 1.
Figure 3A:
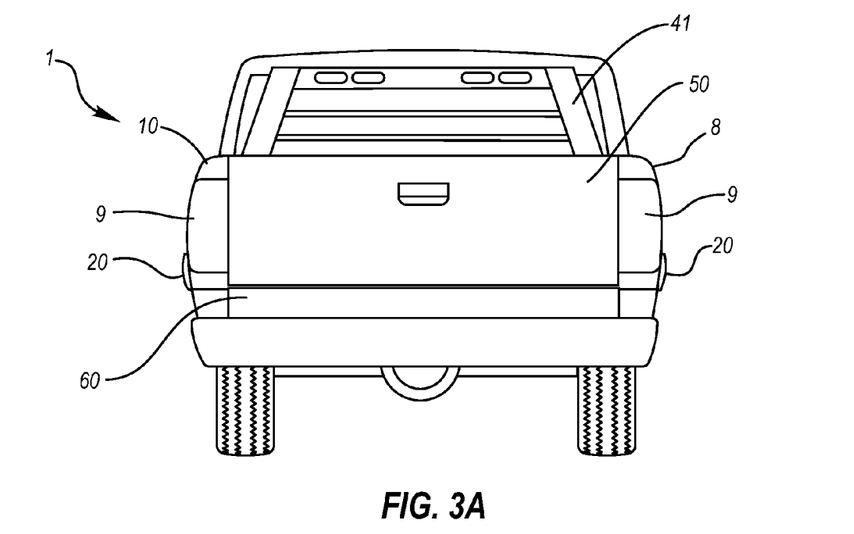
FIG. 3A is a rear view of the convertible pickup truck cargo box system implementation of FIG. 1.
Figure 3B:
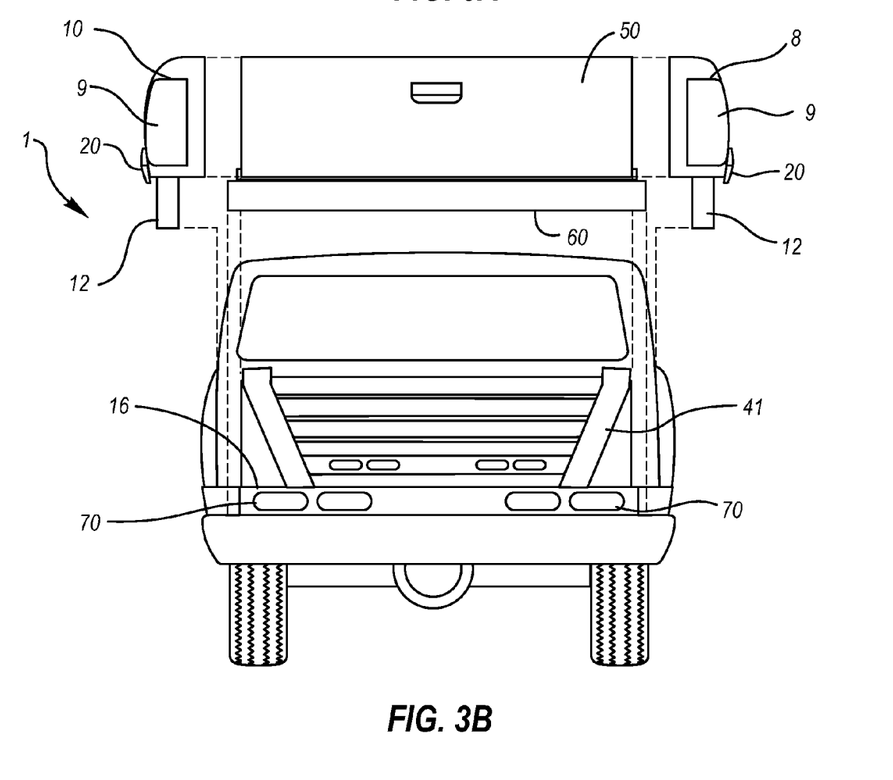
FIG. 3B is an exploded rear view of the convertible pickup truck cargo box system implementation of FIG. 3A.

Upright, removable side panels 8 and 10 are removably coupled atop flat bed 16 so that they can be completely detached from bed 16 with speed and ease. In this implementation, upright posts 12 accomplish this. Posts 12 may be an integral part of side panels 8 and 10 or they me be coupled to side panels 8 and 10. Notwithstanding, posts 12 correspond with pockets 17 and are spaced apart and located along the bottoms of side panels 8 and 10.

Posts 12 are removably secured within pockets 17. This may be accomplished electronically, hydraulically, or manually for example using locking pins that are adjacent pockets 17 and that removably engage with posts 12 once they are installed in pockets 17 to hold side panels 8 and 10 in place safely and securely when installed. In this particular implementation, there may be electronic locking pins 90 adjacent pockets 17 that removably engage with posts 12 once they are installed in pockets 17 to hold side panels 8 and 10 in place safely and securely when installed.

Electronic locking pins 90 may be electrically coupled via wiring, etc. to an electronic switch 80 in the cab of the pickup truck. Switch 80 may be located on the dashboard as shown, though it could be located under the dashboard, on a center console, on the driver's side door, or at any other suitable location. Electronic switch 80 allows a driver or passenger to engage or disengage pins 90 as desired from the convenience of the cab.

Electronic sensors may also be located adjacent pockets 17 and may or may not be part of electronic pins 90. Notwithstanding, whether separate from or integrated with pins 90, the electronic sensors are electrically coupled via wiring, etc. to an electronic display 82 in the cab of the pickup truck. Display 82 may include a warning light that shows a driver or passenger through suitable icons the engagement, disengagement, and/or malfunction of the pins 90 with respect to posts 12. These icons may be of a suitable warning color and may flash, remain constantly on, or some combination of the forgoing for some specified period of time for example. Display 82 may also include an audible function that beeps at a particular volume level and for a specific period of time as well depending on the state of electronic locking pins 90. Display 82 may be located on the dashboard as shown, though it could be located on a center console, on the driver's side door, or at any other suitable location.

Figure 1:
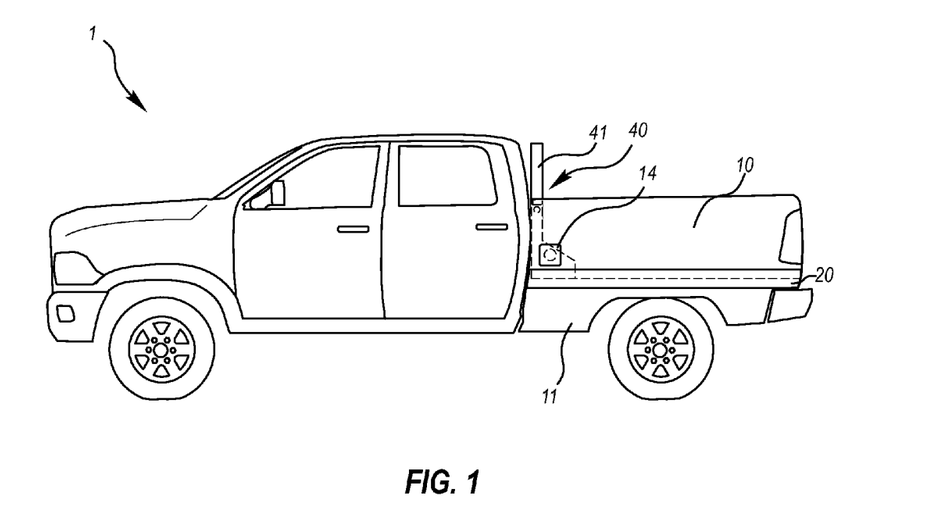
FIG. 1 is a side view of an implementation of a convertible pickup truck cargo box system.

At least side panel 10 may have a fuel door 14. In other implementations, both side panels 8 and 10 may have fuel doors. Notwithstanding, because side panel 10 is removable, fuel door 14 is free from fuel filler tube assembly 15 that extends to the gas tank. Instead, fuel door 14 just allows access to fuel filler tube 15. So as to be properly supported, fuel filler tube assembly 15 may be coupled to a brace of the lower portion 42 of headache rack 40. Alternatively, fuel filler tube assembly 15 may be coupled to bed 16.

Side panels 8 and 10 also may each have slots 21 to aid a user in installing and removing the panels when locking pins 90 are not in engagement with posts 12. In other implementations, instead of slots 21, they may be handles similar to the handle on the back of a tailgate (with associated mechanical linkages and couplings) that mechanically interface/interact with manual locking pins to both engage and disengage the manual locking pins from posts 12.

Each side panel 8 and 10 may have a conventional tail/brake/turn signal light assembly 9. However, in this implementation assemblies 9 are activated and serve their intended purposes when sidewalls 8 and 10 are removably coupled atop flat bed 16. This is accomplished when posts 12 are removably secured within pockets 17. At the bottom of at least two pockets 17 (for example, the pockets 17 closest to assemblies 9), a suitable electronic switch 18 is located. Electronic switch 18 may be of a plunger type and may control the operation of both light assemblies 9 as well as flat bed light assemblies 70.

When post 12 forces electronic switch 18 downwardly an electrical connection is made so that assemblies 9 operate. However, when side panels 8 and 10 are removed and the posts 12 are removed from pockets 17 (along with tailgate 50 and cover 60), the plunger extends upwardly and the electrical connection to assemblies 9 is lost and the electrical connection to flat bed light assemblies 70 is made.

Secondary flat bed light assemblies 70 are also conventional tail/brake/turn signal light assemblies. However, they are located above the bumper and below the tailgate and are only exposed when tailgate 50 and then cover 60 are removed. Cover 60 is removably coupled to the rear of bed 16 above the bumper and below the tailgate so as to conceal light assemblies 70 when they are not in use, so the truck retains the appearance of a normal truck. In this implementation, cover 60 may removably slide into opposing slots 64 formed on or coupled to the bed 16. Once tailgate 50 is installed, cover 60 will remain in place. Alternatively, cover 60 may be removably coupled to bed 16 in any other suitable manner. For that matter, flat bed light assemblies 70 may be concealed in other manners and with different components as well.

The seam between side panels 8 and 10 and flat bed 16 is concealed behind side trim molding 20 so that their interface is not seen, giving the normal and cosmetic appearance of a standard pickup truck cargo box. In this implementation, side trim molding 20 is attached to side panels 8 and 10 and not attached to flat bed 16 and/or lower panels 11. Thus, when side panels 8 and 10 are removed, trim molding 20 is removed as well leaving just bed 16 with its flat surface.

Removable tailgate assembly 50 (otherwise known as a drop gate assembly) is the rearward most transverse wall portion of the cargo box and is removably coupled between side panels 8 and 10 in any standard arrangement/configuration so that it can both operate normally and, as appropriate, be completely detached with speed and ease. More specifically, tailgate assembly 50 may be removably pivotally coupled between side panels 8 and 10 and positionable between a closed position wherein the tailgate is generally vertically oriented and an open position wherein the tailgate is generally horizontally positioned and supported in place with a pair of steel cables or something similar one each extending from side panels 8 and 10, respectively.

Fold-up cab guard or headache rack 40 is the located against the cab at the forward most transverse wall portion of the cargo box and is at least coupled to bed 16 (though it could also be coupled to the forward most transverse wall portion of the cargo box and/or the cab) between side panels 8 and 10 in any standard arrangement/configuration. In its extended position, headache rack 40 protects passengers from loads/cargo coming through the rear cab window and also facilitates connecting various accessories to the vehicle such as additional conspicuity, signal and identification lights, cargo lights, spotlights, reflectors, spare tires, etc. When in its folded position, it is within the cargo box and facilitates the appearance of a standard pickup truck.

Headache rack 40 can be one of many different configurations with both upright and side members. Headache rack 40 may also include similar locking systems and sensors, switches, etc. as described for side panels 8 and 10 and bed 16 if desired.

In this particular implementation, headache rack 40 is foldable in half horizontally and includes a manual locking system 44. Specifically, headache rack 40 may be of tubular construction having an upper portion 41 with a tubular frame in a general shape of the cab of the pickup truck and a lower portion 42 with opposing braces affixed to the bed 16 at lower ends and upper ends that are pivotally coupled to either side of the tubular frame of upper portion 41. Upper Portion 41 may pivot between the braces of lower portion 42 in any manner. In this implementation, manual locking system 44 is employed. It includes at least one spring biased locking pin assembly in one side of upper portion 41 that removably engages with corresponding different holes located in one of the braces of lower portion 42. Notwithstanding, there could be two spring biased locking pin assembly in each opposing side of upper portion 41 that removably engages with corresponding different holes located in each of the braces of lower portion 42.

Thus, in recreational and personal applications, the headache rack may be in an extended position or folded down depending on the choice of the driver and the appearance he/she wants to portray with the vehicle for example. For commercial and work applications, the headache rack may be in its extended position to help protect the passengers from the cargo/load and to otherwise participate in the particular application.

Other Implementations

Many additional implementations are possible.

Figure 2B:
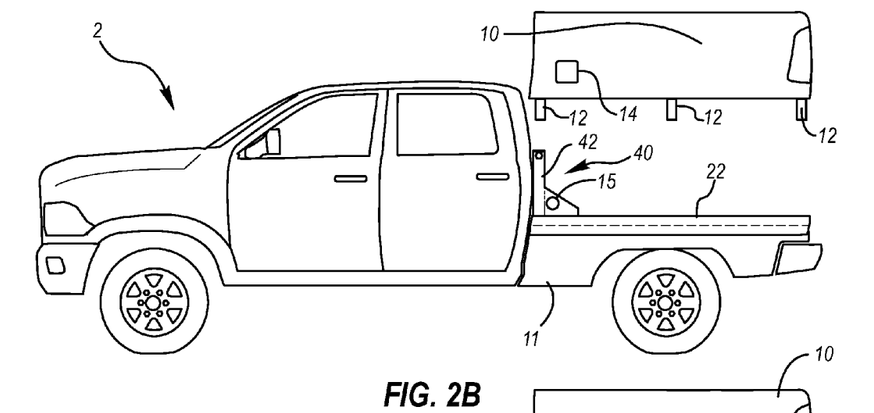
FIG. 2B is a partially exploded side view of another implementation of a convertible pickup truck cargo box system.

Although there are a variety of convertible pickup truck cargo box system implementations, turning to FIG. 2B and for the exemplary purposes of this disclosure, convertible pickup truck cargo box system 2 is shown. Convertible pickup truck cargo box system 2 is similar to convertible pickup truck cargo box system 1. The principal difference is side molding 22.

In this implementation, the seam between side panels 8 and 10 and flat bed 16 is concealed behind side trim molding 22 so that their interface is not seen, giving the normal and cosmetic appearance of a standard pickup truck cargo box. In this implementation, side trim molding 22 is attached to lower panels 11 and not attached to side panels 8 and 10. Thus, when side panels 8 and 10 are removed, trim molding 22 remains with flat bed 16.

Side trim molding 22 can be constructed of a rugged, heavy duty, and resilient material and can be so attached to flat bed 16 and/or lower panels 11 that it can function as a bumper for protecting the pickup truck when loading cargo onto flat bed 16 with machinery like a forklift for example.

Figure 2C:
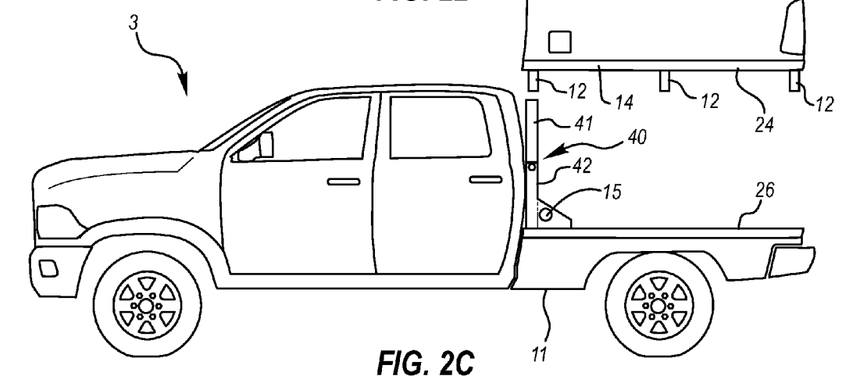
FIG. 2C is a partially exploded side view of still another implementation of a convertible pickup truck cargo box system.
Figure 2D:
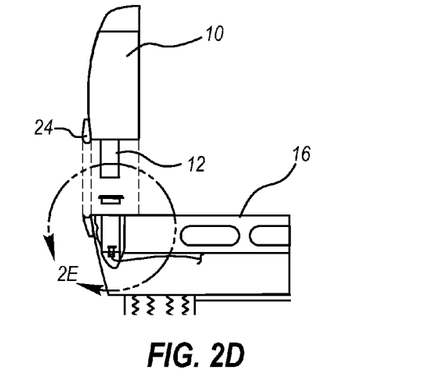
FIG. 2D is a partially broken away rear view of the convertible pickup truck cargo box system implementation of FIG. 2C.
Figure 2E:
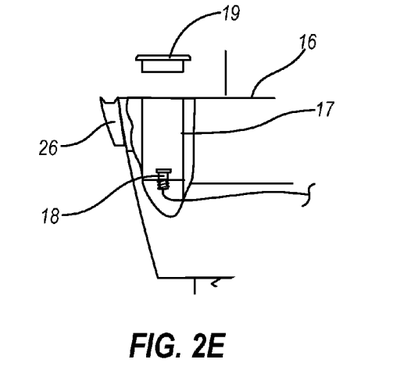
FIG. 2E is a view from FIG. 2D enlarged for magnification purposes.

Although there are a variety of convertible pickup truck cargo box system implementations, turning to FIGS. 2C-2E and for the exemplary purposes of this disclosure, convertible pickup truck cargo box system 3 is shown. Convertible pickup truck cargo box system 3 is similar to convertible pickup truck cargo box systems 1 and 2. The principal difference is side molding 24 and 26.

In this implementation, the seam between side panels 8 and 10 and flat bed 16 is concealed behind side trim upper and lower moldings 24 and 26 so that their interface is not seen, giving the normal and cosmetic appearance of a standard pickup truck cargo box. In this implementation, side trim upper molding 24 is attached to side panels 8 and 10 and side trim lower molding 26 is attached to flat bed 16 and/or lower panels 11. Thus, when side panels 8 and 10 are removed, trim upper molding 24 remains with side panels 8 and 10 and trim lower molding 26 remains with flat bed 16.

Side trim upper molding 24 may interface with side trim lower molding 26 in any manner when side panels 8 and 10 are installed atop flat bed 16. For the exemplary purposes of this disclosure, as shown in FIGS. 2D and 2E, side trim molding 24 may interface with side trim molding 26 in a tongue and groove where a bottom edge of side trim molding 24 is formed as a tongue or protrusion and the top edge of side trim molding 26 is formed as a groove. Alternatively, a bottom edge of side trim molding 24 may be formed as a groove and the top edge of side trim molding 26 may be formed as a tongue or protrusion.

Notwithstanding, side trim molding 24 may interface with side trim molding 26 in any other arrangement. For example, side trim molding 24 may interface with side trim molding 26 in a simple butt joint arrangement, a rabbet joint arrangement, a half lap joint arrangement, a drop leaf joint arrangement, in a snap fit arrangement, in an interlocking channel arrangement, and the like.

Side trim molding 24 and 26 may be constructed of a rugged, heavy duty, and resilient material and side molding 26 can be so attached to flat bed 16 and/or lower panels 11 that it can function as a bumper for protecting the pickup truck when loading cargo onto flat bed 16 with machinery like a forklift for example.

Figure 4F:
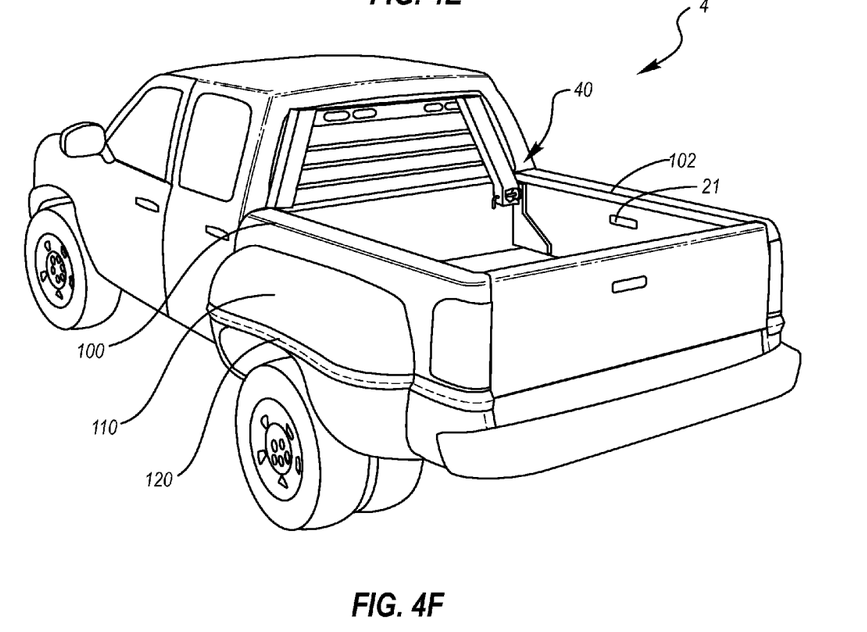
FIG. 4F is a rear perspective view of a dually implementation of a convertible pickup truck cargo box system.

Although there are a variety of convertible pickup truck cargo box system implementations, for the exemplary purposes of this disclosure, convertible pickup truck cargo box system 4 is shown in FIG. 4F. Convertible pickup truck cargo box system 4 is similar to convertible pickup truck cargo box systems 1, 2, and 3. The principal difference is convertible pickup truck cargo box system 4 is a dually implementation.

Convertible pickup truck cargo box system 4 includes side panels 100 and 102 (that each have handles 21 or slots to aid a user in installing and removing the panels). Each side panel 100 and 102 includes a flared wheel well 110 that extends outwardly a predetermined distance to accommodate the dual rear tires of the pickup truck. Side trim molding 120 is also included and is similar to either side trim moldings 20, 22, and 24 and 26 as previously explained.

Although there are a variety of convertible pickup truck cargo box system implementations, for the exemplary purposes of this disclosure, other accessories can be provided for use with convertible pickup truck cargo box system implementations. For example, a tripod type system may be provided to hold the side panels and tailgate assembly when removed. Alternatively, a wall mount system may be employed to hold the side panels and tailgate assembly when removed.

Further implementations are within the DESCRIPTION and the CLAIMS.

Specifications, Materials, Assembly, and Manufacture

It will be understood that implementations are not limited to the specific components disclosed herein, as virtually any components consistent with the intended operation of a convertible pickup truck cargo box system implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a convertible pickup truck cargo box system implementation. Implementations are not limited to uses of any specific components, provided that the components selected are consistent with the intended operation of a convertible pickup truck cargo box system implementation.

Accordingly, the components defining any convertible pickup truck cargo box system implementation may be formed of any of many different types of materials or combinations thereof that can readily be formed into shaped objects provided that the components selected are consistent with the intended operation of a convertible pickup truck cargo box system implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Various convertible pickup truck cargo box system implementations may be manufactured using conventional procedures as added to and improved upon through the procedures described here. Some components defining convertible pickup truck cargo box system implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of convertible pickup truck cargo box system implementations are not limited to the specific order of steps as disclosed in this document. Any steps or sequence of steps of the assembly of such implementations indicated herein are given as examples of possible steps or sequence of steps and not as limitations, since various assembly processes and sequences of steps may be used to assemble such implementations.

Operation and Use

In describing the operation of convertible pickup truck cargo box system implementations further, reference will be made to FIGS. 1-2A and 3A-4E and convertible pickup truck cargo box system 1. However, convertible pickup truck cargo box systems 2, 3, and 4 may operate in a similar fashion.

Convertible pickup truck cargo box system 1 allows a pickup truck to easily convert/transform to a flat bed truck and back again, giving a greater range of utility, versatility, options, and cosmetic appearance for both commercial/work applications and recreational/personal applications in just one vehicle. In essence, convertible pickup truck cargo box system 1 transforms a personal pickup truck into a work vehicle and then back again.

To accomplish this and for recreational/personal applications, upright, removable side panels 8 and 10 are removably coupled atop flat bed 16. Posts 12 are removably secured within pockets 17. Then a driver or passenger from the convenience of the cab uses electronic switch 80 to removably engage pins 90 with posts 12 once they are installed in pockets 17 to hold side panels 8 and 10 in place safely and securely when installed. Electronic sensors then inform the driver or passenger through display 82 of the engagement and/or malfunction of the pins 90 with respect to posts 12.

Additionally, when posts 12 are removably secured within pockets 17, posts 12 force electronic switches 18 downwardly so that an electrical connection is made to tail/brake/turn signal light assemblies 9. Once activated, assemblies 9 operate to serve their intended purposes.

When properly installed, the seam between side panels 8 and 10 and flat bed 16 is concealed behind side trim molding 20 so that their interface is not seen. This gives the normal cosmetic appearance of a standard pickup truck cargo box.

If not already installed, cover 60 and then tailgate 50 are also installed.

When a commercial/work application arises, removable side panels 8 and 10 may be removed from flat bed 16 with speed and ease. A driver or passenger from the convenience of the cab uses electronic switch 80 to removably disengage pins 90 from posts 12. Electronic sensors then inform the driver or passenger through display 82 of the disengagement and/or malfunction of the pins 90 with respect to posts 12. Thus, when side panels 8 and 10 are removed, trim molding 20 is removed as well leaving just bed 16 with its flat surface.

If not already done so, tailgate 50 and then cover 60 may be removed, thereby exposing flat bed tail/brake/turn signal light assemblies 70. When posts 12 are removed from pockets 17, electronic switches 18 make electrical connection to flat bed light assemblies 70. Once activated, assemblies 70 operate to serve their intended purposes.

In either commercial/work or recreational/personal applications, fold-up headache rack 40 may be used. In its extended position, headache rack 40 protects passengers from loads/cargo coming through the rear cab window and also facilitates connecting various accessories to the vehicle such as additional conspicuity, signal and identification lights, cargo lights, spotlights, reflectors, spare tires, etc. When in its folded position, it is within the cargo box and facilitates the appearance of a standard pickup truck.

Headache rack 40 is foldable in half horizontally and includes a manual locking system 44. A driver or passenger or loader for that matter can operate a spring biased locking pin assembly in a side of upper portion 41 and removably engage or disengage a locking pin with corresponding different holes located in a brace of lower portion 42.

Implementations of convertible pickup truck cargo box system are particularly useful in both recreational and commercial applications as previously explained. However, implementations are not limited to uses relating to just conversion between normal cargo box and flat bed applications. Rather, any description relating to flat bed applications is for the exemplary purposes of this disclosure, and implementations may also be used in a variety of other commercial applications with similar results.

For the exemplary purposes of this disclosure, convertible pickup truck cargo box system implementations may be used as work body trucks, tanker body trucks, dump body trucks, sweeper body trucks, and other types of trucks. That is, other types of bodies may be removably coupled to the flat beds of convertible pickup truck cargo box system implementations in a similar manner as side panels and tailgate assemblies.

Figure 5A:
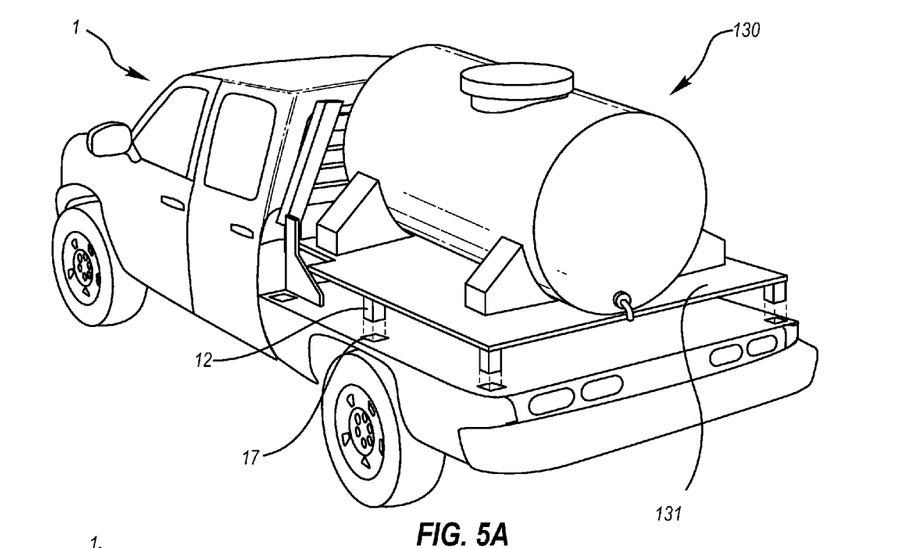
FIG. 5A is a rear exploded perspective view of a tanker body implementation of a convertible pickup truck cargo box system.

Turning to FIG. 5A and for the exemplary purposes of this disclosure, a rear exploded perspective view of a tanker body implementation in use with convertible pickup truck cargo box system 1 is shown. Tanker body 130 includes a tank mounted onto platform 131 that has posts 12 that can be installed into pockets 17 in flat bed 16.

Figure 5B:
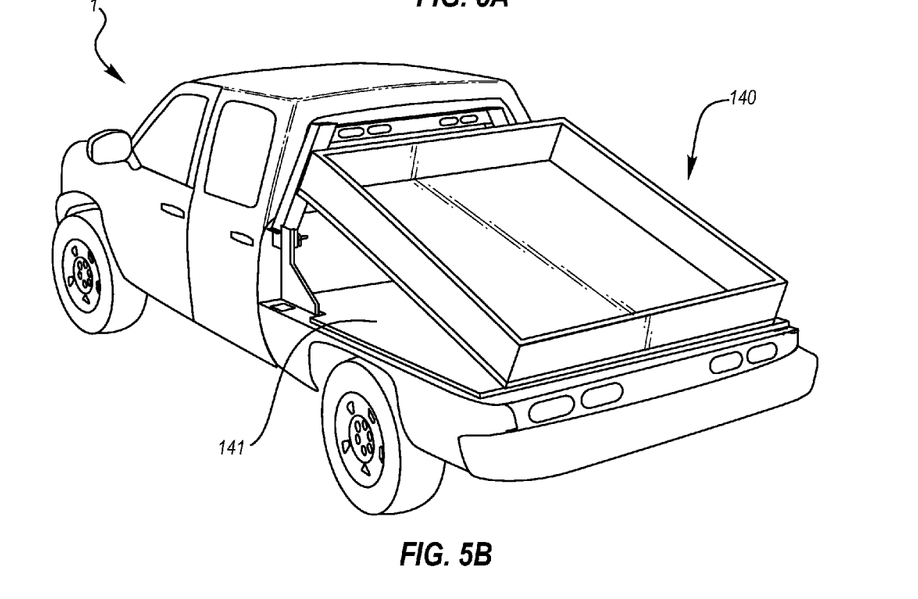
FIG. 5B is a rear perspective view of a dump body implementation of a convertible pickup truck cargo box system.

Referring to FIG. 5B and for the exemplary purposes of this disclosure, a rear perspective view of a dump body implementation in use with convertible pickup truck cargo box system 1 is depicted. Dump body 140 includes a dump box mounted onto platform 141 that (while not shown) has posts 12 that can be installed into pockets 17 in flat bed 16.

Figure 5C:
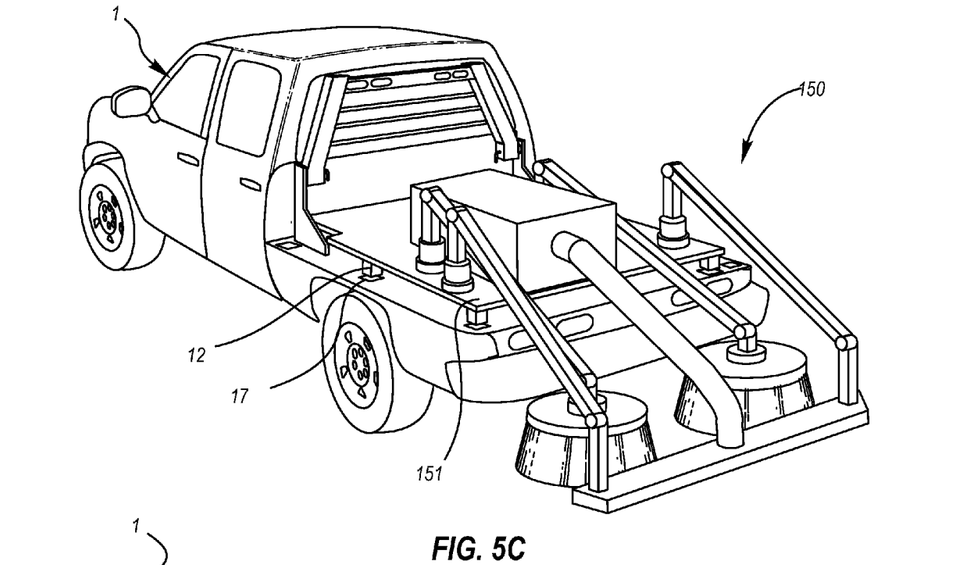
FIG. 5C is a rear exploded perspective view of a sweeper body implementation of a convertible pickup truck cargo box system.

Turning to FIG. 5C and for the exemplary purposes of this disclosure, a rear exploded perspective view of a sweeper body implementation in use with convertible pickup truck cargo box system 1 is shown. Sweeper body 150 includes a sweeping system mounted onto platform 151 that has posts 12 that can be installed into pockets 17 in flat bed 16.

Figure 5D:
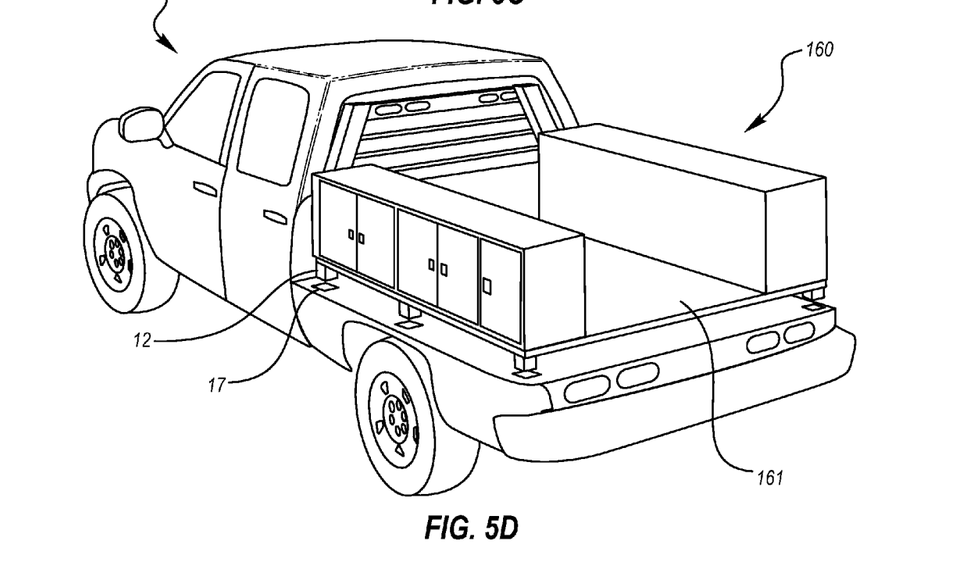
FIG. 5D is a rear exploded perspective view of a work body implementation of a convertible pickup truck cargo box system.

Referring to FIG. 5D and for the exemplary purposes of this disclosure, a rear exploded perspective view of a work body implementation in use with convertible pickup truck cargo box system 1 is depicted. Work body 150 includes various cabinets mounted onto platform 161 that has posts 12 that can be installed into pockets 17 in flat bed 16.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A convertible cargo box system for a pickup truck comprising:
    a flat bed;
    opposing side panels removably coupled atop the flat bed, each side panel comprising a tail/brake/turn signal light assembly; and
    side trim molding that conceals a seam interface between the side panels and the flat bed, thereby providing an appearance of a standard pickup truck cargo box, wherein the side trim molding is coupled to both the side panels and the flat bed and comprises separate upper molding portions coupled to the side panels and separate lower molding portions coupled to the flat bed.

2. The convertible pickup truck cargo box system of claim 1, wherein
    the separate upper molding portions interface with the separate lower molding portions in one of:
    a tongue and groove arrangement;
    a butt joint arrangement;
    a rabbet joint arrangement;
    a half lap joint arrangement;
    a drop leaf joint arrangement;
    a snap fit arrangement; and
    an interlocking channel arrangement.

3. The convertible pickup truck cargo box system of claim 1, wherein the removable side panels are removably coupled atop the flat bed in a post and pocket arrangement.

4. The convertible pickup truck cargo box system of claim 3, wherein the flat bed comprises at least two opposing pairs of spaced apart pockets, each pair of pockets defined along an opposing side peripheral edge of the flat bed, wherein each side panel comprises at least one pair of spaced apart posts located along its bottom, each pair of posts corresponding to and removably coupled with one of the opposing pairs of spaced apart pockets.

5. The convertible pickup truck cargo box system of claim 4 further comprising locking pins that removably engage the posts once they are installed in the pockets to hold the side panels in place.

6. The convertible pickup truck cargo box system of claim 5, wherein the locking pins are electronic locking pins that are electrically coupled to an electronic switch in a cab of the pickup truck.

7. The convertible pickup truck cargo box system of claim 1, further comprising a fold up headache rack located between the side panels at a forward most transverse wall portion of the cargo box.

8. The convertible pickup truck cargo box system of claim 7, wherein the headache rack is foldable in half horizontally and comprises an upper portion with a frame in a general shape of a cab of a pickup truck and a lower portion with opposing braces coupled to the flat bed at lower ends and upper ends that are pivotally coupled to either side of the frame of the upper portion.

9. The convertible pickup truck cargo box system of claim 1, wherein the flat bed comprises secondary flat bed tail/brake/turn signal light assemblies, and further comprising a rear cover that is removably coupled to a rear of the flat bed above a bumper and below a tailgate assembly so as to conceal the secondary flat bed tail/brake/turn signal light assemblies when not in use.

10. The convertible pickup truck cargo box system of claim 9, wherein the cover removably slides into opposing slots formed on or coupled to the flat bed.

11. The convertible pickup truck cargo box system of claim 1, further comprising a removable tailgate assembly as a rearward most transverse wall portion of the cargo box that is removably coupled between the side panels.

12. A convertible cargo box system for a pickup truck comprising:
    a flat bed comprising secondary flat bed tail/brake/turn signal light assemblies;
    opposing side panels removably coupled atop the flat bed, each side panel comprising a tail/brake/turn signal light assembly;

side trim molding that conceals a seam interface between the side panels and the flat bed, thereby providing an appearance of a standard pickup truck cargo box;

a fold up headache rack located between the side panels at a forward most transverse wall portion of the cargo box; and a rear cover that is removably coupled to a rear of the flat bed above a bumper and below a tailgate assembly so as to conceal the secondary flat bed tail/brake/turn signal light assemblies when not in use.

13. The convertible pickup truck cargo box system of claim 12, wherein the headache rack is foldable in half horizontally and comprises an upper portion with a frame in a general shape of a cab of a pickup truck and a lower portion with opposing braces coupled to the flat bed at lower ends and upper ends that are pivotally coupled to either side of the frame of the upper portion.

14. The convertible pickup truck cargo box system of claim 12, wherein the side trim molding is one of:
coupled to the side panels;
coupled to the flat bed; and
coupled to both the side panels and the flat bed.

15. The convertible pickup truck cargo box system of claim 12, wherein the flat bed comprises at least two opposing pairs of spaced apart pockets, each pair of pockets defined along an opposing side peripheral edge of the flat bed, wherein each side panel comprises at least one pair of spaced apart posts located along its bottom, each pair of posts corresponding to and removably coupled with one of the opposing pairs of spaced apart pockets.

16. The convertible pickup truck cargo box system of claim 15 further comprising electronic locking pins that are electrically coupled to an electronic switch in a cab of the pickup truck, the electronic locking pins removably engaging the posts once they are installed in the pockets to hold the side panels in place.

17. The convertible pickup truck cargo box system of claim 12, wherein the cover removably slides into opposing slots formed on or coupled to the flat bed.

18. A convertible cargo box system for a pickup truck comprising:

a flat bed comprising secondary flat bed tail/brake/turn signal light assemblies;

opposing side panels removably coupled atop the flat bed, each side panel comprising a tail/brake/turn signal light assembly;

side trim molding that conceals a seam interface between the side panels and the flat bed, thereby providing an appearance of a standard pickup truck cargo box; and a rear cover that is removably coupled to a rear of the flat bed above a bumper and below a tailgate assembly so as to conceal the secondary flat bed tail/brake/turn signal light assemblies when not in use.

19. The convertible pickup truck cargo box system of claim 18, wherein the cover removably slides into opposing slots formed on or coupled to the flat bed.

* * * * *